(12) United States Patent
Zeng et al.

(10) Patent No.: US 10,461,318 B2
(45) Date of Patent: Oct. 29, 2019

(54) SYSTEMS AND METHODS FOR LITHIUM-ION CELL MANUFACTURING TO REDUCE CELL CONTAMINATION

(71) Applicant: GM GLOBAL TECHNOLOGY OPERATIONS LLC, Detroit, MI (US)

(72) Inventors: Sherman H. Zeng, Troy, MI (US); Zhiqiang Yu, Shanghai (CN); Dewen Kong, Shanghai (CN); Haijing Liu, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 15/383,118

(22) Filed: Dec. 19, 2016

(65) Prior Publication Data

US 2018/0175373 A1 Jun. 21, 2018

(51) Int. Cl.
*H01M 4/1391* (2010.01)
*H01M 4/04* (2006.01)
*H01M 10/0525* (2010.01)
*H01M 4/505* (2010.01)

(52) U.S. Cl.
CPC .......... *H01M 4/1391* (2013.01); *H01M 4/04* (2013.01); *H01M 4/043* (2013.01); *H01M 4/0471* (2013.01); *H01M 10/0525* (2013.01); *H01M 4/505* (2013.01); *H01M 2220/20* (2013.01)

(58) Field of Classification Search
CPC ......... H01M 10/0525; H01M 2220/20; H01M 4/04; H01M 4/043; H01M 4/0471; H01M 4/1391; H01M 4/505
See application file for complete search history.

(56) References Cited

U.S. PATENT DOCUMENTS

| 7,722,994 B2 | 5/2010 | Halalay |
| 8,974,946 B2 | 3/2015 | Cai et al. |
| 2012/0214040 A1* | 8/2012 | Tsutsumi ............... H01G 11/26 429/99 |
| 2014/0295068 A1* | 10/2014 | Nanba ................. H01M 4/0404 427/122 |

* cited by examiner

*Primary Examiner* — Lingwen R Zeng
(74) *Attorney, Agent, or Firm* — Quinn IP Law

(57) ABSTRACT

A system for forming an electrode for a lithium-ion battery cell includes an electrode material, a material-supply mechanism, a wetting mechanism, a debris-generating tool, and a conditioner. The material-supply mechanism is configured to deliver the electrode material. The wetting mechanism is configured to receive the electrode material from the material-supply mechanism and apply a solution to the electrode material to produce a wet precursor. The debris-generating tool is configured to remove a portion of the electrode material from the wet precursor to form a pre-electrode. The conditioner is configured to eliminate the solution from the pre-electrode and thereby form the electrode.

14 Claims, 2 Drawing Sheets

SYSTEMS AND METHODS FOR LITHIUM-ION CELL MANUFACTURING TO REDUCE CELL CONTAMINATION

The disclosure relates to a method of and system for forming an electrode for a lithium-ion battery cell.

Lithium-ion batteries can be used as a power source in many applications ranging from vehicles to portable electronics such as laptop computers, cellular phones, and so on. One such application, an electric-based vehicle ("EV"), requires efficient and low-cost energy storage systems having high energy density and high power capability. Such EVs can include, for example, hybrid electric vehicles (HEV), battery electric vehicles (BEV), plug-in HEVs, and extended-range electric vehicles (EREV). The EVs powered by lithium-ion batteries often have an expected driving-range based on test and design data.

During manufacturing of the lithium-ion batteries, debris may be generated. The debris can be in the form of burrs or particulate matter such as metallic particles, particles from materials used during the manufacturing process, and other contaminants.

SUMMARY

It is desirable to reduce contamination of lithium-ion cells. According to aspects of the present disclosure, contamination of lithium-ion cells is reduced through management of debris during lithium-ion cell manufacturing.

According to aspects of the present disclosure, a method of forming an electrode for a lithium-ion battery cell, the method includes wetting an electrode material with a solution to form a wet precursor, removing a portion of the electrode material from the wet precursor with a debris-generating tool to form a pre-electrode, and eliminating the solution from the pre-electrode to thereby form the electrode.

According to further aspects of the present disclosure, eliminating the solution further comprises actively eliminating the solution from the pre-electrode.

According to further aspects of the present disclosure, actively eliminating the solution comprises at least one of reducing, via a vacuum mechanism, air pressure exerted on the pre-electrode to evaporate or vaporize the solution, increasing, via a heating mechanism, a temperature of the pre-electrode to evaporate or vaporize the solution, or directing, via an airflow mechanism, airflow over the pre-electrode to evaporate or vaporize the solution.

According to further aspects of the present disclosure, the solution is water and actively eliminating the solution comprises applying an organic solvent to the pre-electrode.

According to further aspects of the present disclosure, the organic solvent is applied to the pre-electrode in a gas phase.

According to further aspects of the present disclosure, wetting the electrode is concurrent to removing the portion.

According to further aspects of the present disclosure, wetting includes immersing the electrode material in a pool of the solution.

According to further aspects of the present disclosure, removing the portion includes stamping the wet precursor with a stamping tool.

According to further aspects of the present disclosure, removing the portion includes cutting the wet precursor with a cutting tool.

According to aspects of the present disclosure, a system for forming an electrode for a lithium-ion battery cell, the system includes an electrode material, a material-supply mechanism, a wetting mechanism, a debris-generating tool, and a conditioner. The material-supply mechanism is configured to deliver the electrode material. The wetting mechanism is configured to receive the electrode material from the material-supply mechanism and apply a solution to the electrode material to produce a wet precursor. The debris-generating tool is configured to remove a portion of the electrode material from the wet precursor to form a pre-electrode. The conditioner is configured to eliminate the solution from the pre-electrode and thereby form the electrode.

According to further aspects of the present disclosure, the conditioner is a vacuum mechanism and is configured to reduce an air pressure exerted on the pre-electrode to thereby evaporate or vaporize the solution.

According to further aspects of the present disclosure, the conditioner is a heating mechanism and is configured to increase a temperature of the solution.

According to further aspects of the present disclosure, the conditioner is an airflow mechanism and is configured to direct airflow over the pre-electrode to evaporate or vaporize the solution.

According to further aspects of the present disclosure, the system further includes an electrode output configured to receive the electrode from the debris-generating tool.

According to further aspects of the present disclosure, the solution is an organic solvent.

According to further aspects of the present disclosure, the organic solvent is aqueous.

According to further aspects of the present disclosure, the organic solvent is gaseous.

According to further aspects of the present disclosure, the solution is water and the system further comprises a water-removal mechanism configured to remove the water from the pre-electrode using an organic solvent.

According to further aspects of the present disclosure, the electrode material is lithium manganese oxide.

The above features and advantages and other features and advantages of the present disclosure are readily apparent from the following detailed description when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

During manufacturing of battery cells such as lithium-ion battery cells, a number of processes may generate debris. For example, debris is generated when cutting and/or stamping dried electrodes. Relative humidity is generally kept low during these processes, such as less than 0.5% relative humidity, which allows the debris generated to easily spread to the entire electrode or battery cell to contaminate the battery cell. It is believed that contamination of the battery cell may degrade performance by interaction between the contaminant and the battery components such as the electrolyte and electrodes. For example, it is believed that debris may affect cell dependability through these interactions. It is further believed that charge-discharge cycles can exacerbate the problems of debris.

It is believed that this debris, once introduced to the battery cell through the electrodes, can dissolve into the electrolyte and deposit on anodes and cathodes as a separator as a dendrite. It is believed that these dendrites may grow during charge and discharge cycles. Further, it is believed that the growing dendrite may cause a soft-short between the electrodes of the battery cell, which may lead to a continuous cell-voltage drop. It is also believed that this situation may become more dominant when battery cells are assembled in a battery module or module pack under mechanical force.

Systems and methods in accordance with the present disclosure may reduce or eliminate several issues related to cost and performance of applications powered by battery cells, such as electric vehicles and portable electronics. According to some aspects of the present disclosure, battery cell voltage drop and loss of isolation resistance after service can be reduced by inhibiting contamination of battery cells. According to some aspects of the present disclosure, inhibiting contamination of battery cells provides optimal battery cell performance, optimized battery cell lifetime, cost-effective manufacturing, reliability, uniformity between battery cells, reduced battery pack rebalance time, reduced overall application cost, and excellent application dependability.

Moreover, according to aspects of the present disclosure, cost savings is achieved during the manufacturing process because the relative humidity can be greater than 0.5%. In some embodiments, the relative humidity is greater than 1%, greater than 5%, greater than 10%, greater than 30%, or greater than 50%. In some embodiments, no dry room is used and the relative humidity is maintained at the ambient relative humidity of the manufacturing facility.

Figure 1:
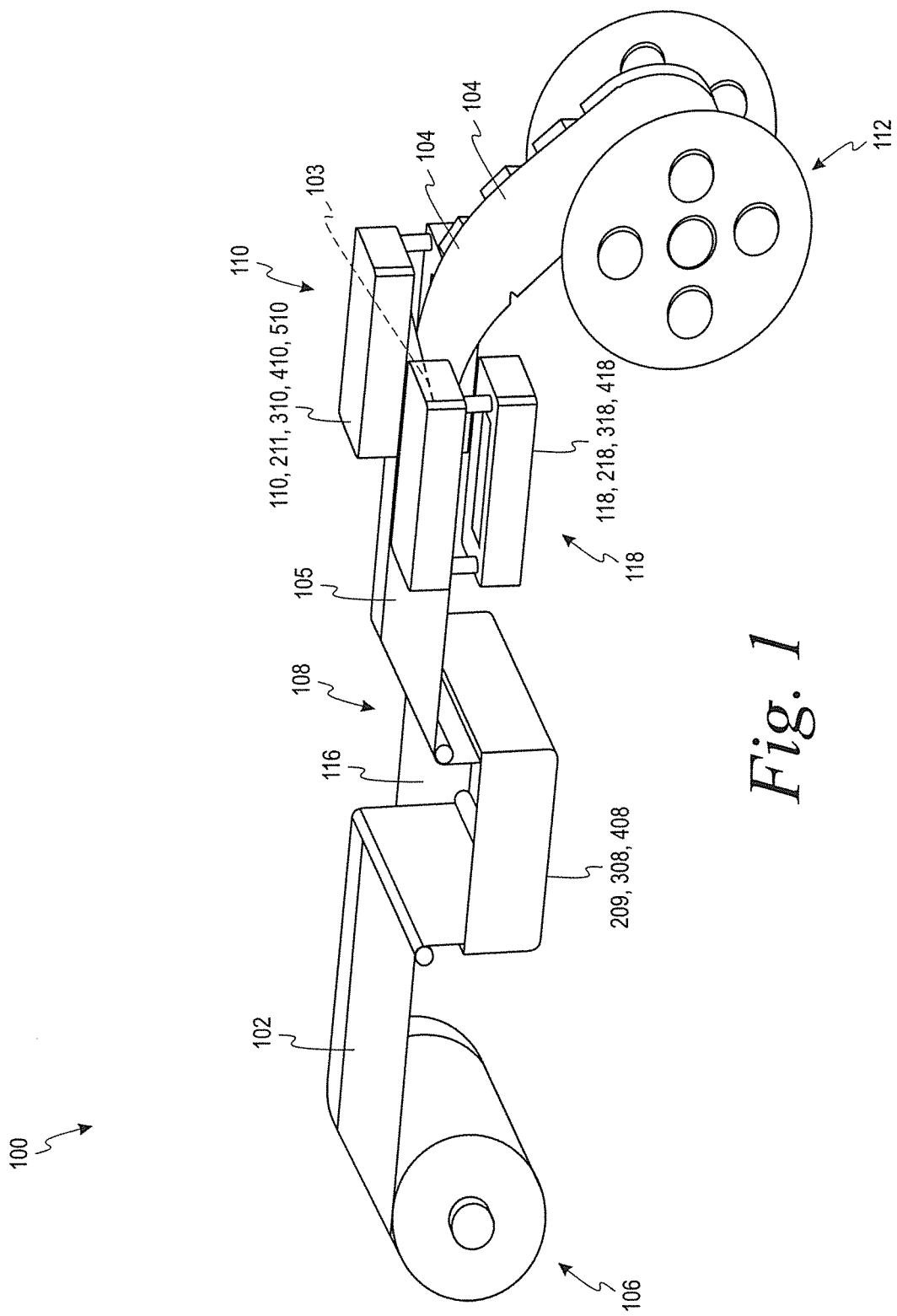
FIG. 1 is a schematic illustration of a perspective view of a system for forming an electrode.

Referring to FIG. 1, a system 100 for forming electrodes 104 for one or more a lithium-ion battery cells is shown. The system 100 includes a material-supply mechanism 106, a wetting mechanism 108, a debris-generating tool 110, and an electrode output 112.

Electrode material 102 is supplied by the material-supply mechanism 106. The electrode material 102 can be any material suitable for producing an electrode for use in a battery cell. In some embodiments, the electrode material 102 is a sheet of material formed from lithium cobalt oxide ($LiCoO_2$) ("LCO"), lithium manganese oxide ($LiMn_2O_4$) ("LMO"), lithium iron phosphate ($LiFePO_4$)("LFP"), nickel cobalt aluminum ($LiNi_{0.8}Co_{0.15}Al_{0.05}O_2$)("NCA"), nickel manganese cobalt ($LiNi_{1-x-y}Mn_xCo_yO_2$)("NMC"), etc.

The electrodes 104 are produced using one or more debris-generating tools 110 such as a notching tool 211, cutting tool 310, polishing tool 410, grinding tool 510, etc. In the illustrated embodiment, the electrodes 104 include tabs 114. The plurality of electrodes 104 is configured to be separated into individual electrodes through additional processes such as stamping or cutting. The tabs 114 of the individual electrodes are configured to be electrically coupled together through, for example, welding and assembled with additional components to produce the lithium-ion battery cell.

The material-supply mechanism 106 is configured to deliver the electrode material 102 to the system 100. In some embodiments, the material-supply mechanism 106 includes a sheet of the electrode material 102 wound about a spool. In some embodiments, the material-supply mechanism 106 is a continuous feed of electrode material to the system 100 from an upstream process.

The wetting mechanism 108 is configured to receive the electrode material 102 from the material-supply mechanism 106 and apply a solution 116 to the electrode material 102 to produce a wet precursor 105. Wetting the electrode material 102 with the solution 116 such that the electrode material 102 remains wetted during a debris-generating process significantly reduces the amount of debris on the product of the debris-generating process such as the electrodes 104. In some embodiments, the wetting mechanism 108 includes a pool of the solution 116. In some embodiments, the wetting mechanism flows or sprays the solution 116 onto the electrode material 102 to provide a sufficient coating thereon.

The solution 116 may be an organic solvent, an aqueous organic solvent, or water. In some embodiments, the organic solvent includes alcohols, aldehydes, carboxylic acids, combinations thereof, and the like. In some embodiments, the aqueous organic solvent includes alcohols, aldehydes, carboxylic acids, or combinations thereof diluted with an amount of water. If solution 116 is water alone, residual water can be removed from the electrode material 102 or the electrodes 104 using an organic solvent prior to assembling the lithium-ion battery cell. In some embodiments, the water is removed using the organic solvent in the gaseous phase.

The debris-generating tool 110 is configured to remove a portion of the electrode material 102 from the wet precursor 105 to form a pre-electrode 103. The portion may be removed from the electrode material 102 through notching, cutting, or the like. In some embodiments, the debris-generating tool 110 is disposed such that the removal of a portion of the electrode material 102 is performed in the pool of the solution 116.

Additional components may be attached or coupled to the debris-generating tool 110. For example, one or more conditioners 118 that actively remove the solution 116 from the electrodes 104 can be included in the system 100 or directly on the debris-generating tool 110. In some embodiments, a vacuum mechanism 218 that provides vacuum suction is coupled to the debris-generating tool 110. The vacuum mechanism 218 provides a lower air pressure around the electrodes 104 to promote removal of the solution through evaporation or vaporization. In some embodiments, a heating mechanism 318 that provides increased temperatures is provided. The heating mechanism 318 increases the temperature of the solution 116 wetting the electrodes 104 to promote removal of the solution 116 through evaporation or vaporization. In some embodiments, an airflow mechanism 418 that provides directed airflow can be used. The airflow mechanism 418 increases airflow onto or over the surface of the electrodes 104 to promote removal of the solution 116 through evaporation or vaporization. Additionally, combinations of these mechanisms can be used.

The electrode output 112 collects the electrodes 104 produced by the debris-generating tool 110. The electrode output 112 is delivered downstream to further systems and processes that separate the electrodes 104 into individual electrodes and assemble the individual electrodes with additional components to produce the lithium-ion battery cell.

In some embodiments, the electrode output 112 is delivered downstream in a batch process. For example, the electrodes 104 can be wound around a spool. Once the spool is full or the material-supply mechanism 106 is exhausted, the spool is removed from the notching system 100 for eventual transport to downstream processes.

In some embodiments, the electrode output 112 is delivered downstream in a semi-continuous or continuous process. For example, the electrodes 104 can be directly fed to downstream processes. This allows the notching system 100 to operate continuously or until the material-supply mechanism 106 is exhausted without interruption for transportation of the electrodes 104.

Figure 2:
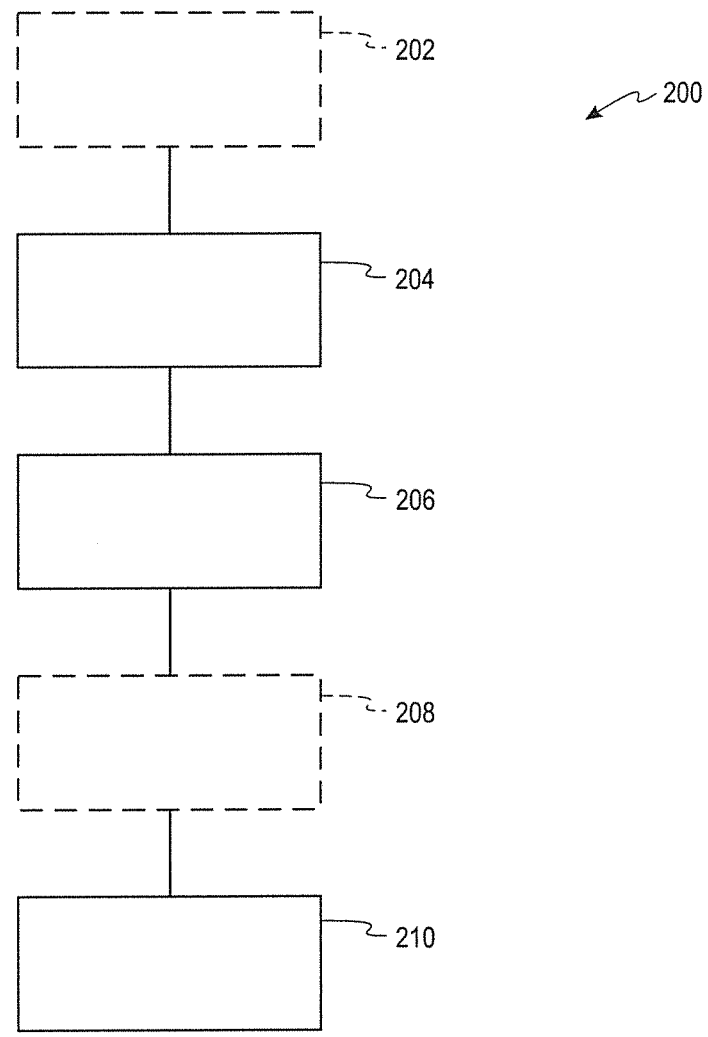
FIG. 2 is a flowchart of a method of forming an electrode.

Referring now to FIG. 2, a method 200 of forming an electrode 104 for a lithium-ion battery cell is shown. The method 200 may reduce contamination during lithium-ion battery cell manufacturing. The method 200 includes wetting 204 an electrode material 102 with the solution 116 to form the wet precursor 105, removing 206 the portion of the electrode material 102 from the wet precursor 105 to form a pre-electrode 103, and eliminating 210 the solution from the pre-electrode 103 to thereby form the electrode 104. The method 200 may optionally include supplying 202 the electrode material 102, and/or applying 208 an organic solvent.

Supplying 202 the electrode material 102 can be accomplished via, for example, the material-supply mechanism 106. The electrode material 102 can be, for example, a sheet of LCO, LMO, LFP, NCA, or NMC.

Wetting 204 the electrode material 102 with the solution 116 forms the wet precursor 105. Wetting 204 the electrode material 102 may be performed via the wetting mechanism 108. The solution 116 is configured to inhibit contamination of the lithium-ion battery cell. In some embodiments, contamination is inhibited by reducing the amount of debris produced during at least one debris-generating process. In some embodiments, contamination is inhibited by reducing the amount of debris that is airborne during at least one debris-generating process. The wetting mechanism 108 can include, for example, an immersion bath 209 configured to immerse the electrode material 102 in a pool of the solution 116, a spraying mechanism 308 configured to spray the solution 116 onto the electrode material 102, or a flowing mechanism 408 configured to flow the solution 116 over the surface of the electrode material 102.

Removing 206 the portion of the electrode material 102 from the wet precursor 105 with a debris-generating tool 110 forms the pre-electrode 103. The portion of the electrode material 102 may be removed using one or more of electrode stamping, electrode cutting, electrode grinding, electrode polishing, and the like. In some embodiments, wetting 204 the electrode material 102 includes immersing the electrode material 102 in the solution 116 and concurrently removing the portion of the electrode material 102 while the electrode material 102 is immersed in the solution 116. In some embodiments, wetting 204 the electrode material 102 includes immersing the electrode material 102 in the solution 116 and removing the portion of the electrode material 102 after the electrode material 102 is removed from the solution 116, but prior to the solution substantially drying from the electrode material 102.

Applying 208 an organic solvent to the pre-electrode 103 can be accomplished in a similar method to wetting 204 the electrode material 102.

Eliminating 210 the solution 116 from the pre-electrode 103 forms the electrode 104. In some embodiments, the solution 116 is eliminated from the pre-electrode 103 prior to assembly of the lithium-ion battery cell. In some embodiments, the solution 116 is eliminated from the pre-electrode 103 after assembling a portion of the lithium-ion battery cell, but prior to contacting the electrode 104 with an electrolyte. Optionally, the solution 116 can be actively removed from the electrode material 102. Active removal of the solution 116 can include, for example, use of a vacuum, increased temperature, use of an additional solvent, combinations thereof, and the like.

It is contemplated that a second solution may be applied to the wet precursor 105, the pre-electrode 103, or the electrode 104 in a similar method to wetting 204 the electrode material 102. The second solution may be the same solution 116 or a different solution. Application of the second solution may be performed before, during, or after the portions of the electrode material 102 are removed and/or the solution 116 is eliminated from the pre-electrode 103.

The following examples are meant to illustrate the disclosure and are not to be viewed in any way as limiting to the scope of the disclosure.

EXAMPLES

Comparative Example 1

A raw LMO electrode is notched and cut at six areas under dry conditions. Samples of the notched and cut LMO electrode are examined under a microscope along the cutting areas for the presence of debris and burrs resulting from the notching and cutting process. Thirteen occurrences of debris are observed along the cutting areas.

Example 2

A raw LMO electrode is wet for five seconds with an ethanol solution to form a wet precursor. Portions of the wet precursor are removed by notching and cutting the wet precursor at six areas while wetted with the ethanol solution. The ethanol solution is then eliminated to form the electrode. The electrode is examined under the microscope along the cutting areas for the presence of debris and burrs resulting from the notching and cutting process. Two occurrences of debris are observed along the cutting areas.

Example 3

A raw LMO electrode is treated for thirty minutes with an ethanol solution to form a wet precursor. Portions of the wet precursor are removed by notching and cutting the wet precursor at six areas while wetted with the ethanol solution. The ethanol solution is then eliminated to form the electrode. The electrode is examined under the microscope along the cutting areas for the presence of debris and burrs resulting from the notching and cutting process. Three occurrences of debris were observed along the cutting areas.

Example 4

A raw LMO electrode is treated for thirty minutes with water to form a wet precursor. Portions of the wet precursor are removed by notching and cutting the wet precursor at six areas while wetted with the ethanol solution. The water is then eliminated to form the electrode. The electrode is examined under the microscope along the cutting areas for the presence of debris and burrs resulting from the notching and cutting process. Three occurrences of debris are observed along the cutting areas.

Table 1 summarizes the results of the Examples. As can be seen in the table, treatments in the Examples result in a significant reduction in observed debris over the untreated Comparative Example.

TABLE 1

| Summary of Results | | |
| --- | --- | --- |
| Treatment | Debris count | Difference |
| Comparative Example 1 | 13 | — |
| Example 2 | 2 | 85% reduction |
| Example 3 | 3 | 77% reduction |
| Example 4 | 3 | 77% reduction |

While the best modes for carrying out the disclosure have been described in detail, those familiar with the art to which this disclosure relates will recognize various alternative designs and embodiments for practicing the disclosure within the scope of the appended claims.

What is claimed is:

1. A method comprising:
   wetting, via a wetting mechanism, an electrode material with a liquid to form a wet precursor;
   removing a portion of the electrode material from the wet precursor with a debris generating tool to form a pre-electrode; and
   eliminating, via a conditioner, the liquid from the pre-electrode to thereby form an electrode,
   wherein the liquid is water and eliminating the liquid comprises applying an organic solvent to the pre-electrode, and
   wherein the organic solvent is applied to the pre-electrode in a gaseous phase.

2. The method of claim 1, wherein the conditioner includes at least one of a vacuum mechanism, a heating mechanism, or an airflow mechanism, and wherein eliminating the liquid comprises at least one of:
   reducing, via the vacuum mechanism, air pressure exerted on the pre-electrode to evaporate or vaporize at least a portion of the liquid;
   increasing, via the heating mechanism, a temperature of the pre-electrode to evaporate or vaporize at least a portion of the liquid; or
   directing, via the airflow mechanism, airflow over the pre-electrode to evaporate or vaporize at least a portion of the liquid.

3. The method of claim 1, wherein wetting the electrode is concurrent to removing the portion.

4. The method of claim 1, wherein wetting includes immersing the electrode material in a pool of the liquid.

5. The method of claim 1, wherein removing the portion includes stamping the wet precursor with a stamping tool.

6. The method of claim 1, wherein removing the portion includes cutting the wet precursor with a cutting tool.

7. A system comprising:
   an electrode material;
   a material-supply mechanism configured to deliver the electrode material;
   a wetting mechanism configured to receive the electrode material from the material-supply mechanism and apply a liquid to the electrode material to produce a wet precursor;
   a debris-generating tool configured to remove a portion of the electrode material from the wet precursor to form a pre-electrode; and
   a conditioner configured to eliminate the liquid from the pre-electrode and thereby form an electrode,
   wherein the liquid is water and the system further includes a water-removal mechanism configured to remove the water from the pre-electrode using an organic solvent, and
   wherein the organic solvent is applied to the pre-electrode in a gaseous phase.

8. The system of claim 7, wherein the conditioner is a vacuum mechanism configured to reduce an air pressure exerted on the pre-electrode to thereby evaporate or vaporize the liquid.

9. The system of claim 7, wherein the conditioner is a heating mechanism configured to increase a temperature of the liquid.

10. The system of claim 7, wherein the conditioner is an airflow mechanism configured to direct airflow over the pre-electrode to evaporate or vaporize the liquid.

11. The system of claim 7, further comprising an electrode output configured to receive the electrode from the debris-generating tool.

12. The system of claim 7, wherein the liquid is an organic solvent.

13. The system of claim 7, wherein the electrode material is lithium manganese oxide.

14. The method of claim 4, wherein wetting the electrode is concurrent to removing the portion.

* * * * *